US011788620B1

(12) United States Patent
Cattoor et al.

(10) Patent No.: US 11,788,620 B1
(45) Date of Patent: Oct. 17, 2023

(54) IN-LINE BRAKE SYSTEM FOR TRANSMISSION (71) Applicant: Dana Belgium N.V., Flanders (BE)

(72) Inventors: Kurt Cattoor, Koolkerke (BE); Filip D. Schacht, Meulebeke (BE); Jessica Versini, Bruges (BE); Joachim Van Dingenen, Drongen (BE); Hein Nevejant, Houthulst (BE)

(73) Assignee: Dana Belgium N.V., Bruges (BE)

( * ) Notice: Subject to any disclaimer, the term of this patent is extended or adjusted under 35 U.S.C. 154(b) by 0 days.

(21) Appl. No.: 17/656,394

(22) Filed: Mar. 24, 2022

(51) Int. Cl.
*F16H 63/30* (2006.01)

(52) U.S. Cl.
CPC ................. *F16H 63/3026* (2013.01)

(58) Field of Classification Search
CPC ............... F16H 63/3026; F16D 65/124; F16D 2065/13; F16D 67/02
See application file for complete search history.

(56) References Cited

U.S. PATENT DOCUMENTS

| 3,157,257 | A | * | 11/1964 | Root | F16D 67/04 |
| | | | | | 192/85.33 |
| 5,653,321 | A | * | 8/1997 | Takaoka | F16H 63/3026 |
| | | | | | 192/85.41 |
| 9,897,166 | B2 | * | 2/2018 | Naito | F16H 61/0265 |
| 10,041,549 | B2 | | 8/2018 | McKinzie et al. | |
| 10,138,955 | B2 | | 11/2018 | Grytzelius et al. | |
| 10,408,288 | B2 | * | 9/2019 | Cyrot | F16D 55/40 |
| 2017/0204962 | A1 | * | 7/2017 | Brownell | F16H 57/046 |
| 2018/0031051 | A1 | * | 2/2018 | McKinzie | F16D 13/52 |
| 2018/0038427 | A1 | * | 2/2018 | Grytzelius | F16D 13/71 |

* cited by examiner

*Primary Examiner* — Jacob S. Scott
*Assistant Examiner* — Farhana Pervin
(74) *Attorney, Agent, or Firm* — McCoy Russell LLP (57) ABSTRACT

Methods and systems are provided for a transmission. In one example, the transmission may include a brake system arranged in-line with a second brake along a longitudinal axis of the transmission. Each brake may have a plurality of separator plates which may be secured to a housing of the transmission by at least one pin. The brake system may further include an end plate positioned between the first brake and the second brake, the end plate secured to the housing by a plurality of dowel pins.

20 Claims, 5 Drawing Sheets

IN-LINE BRAKE SYSTEM FOR TRANSMISSION

FIELD

The present description relates generally to methods and systems for a transmission.

BACKGROUND/SUMMARY

Vehicle speed and motion may be modulated by a transmission which includes gears and various other components to provide power from a prime mover to the vehicle wheels based on adjustment of gear ratios. In some examples, the transmission may be an in-line transmission incorporating one or more planetary gear sets and may include brake and clutch components, such as separator plates and friction plates, that are maintained in place based on a splined interface between the components and a housing of the transmission. The in-line transmission may also depend on a wet braking system, which relies on hydraulic pressure provided by a fluid, such as oil or transmission fluid, to engage/disengage components of the transmission, such as gears.

The use of splined interfaces for the brake and clutch components may be burdened by several drawbacks, however. For example, casting a splined geometry into the housing of the transmission may be costly and complex. Other methods for satisfying the splined interfacing of the brake and clutch components with the housing may include use of a steel drum, which may impose undesirable additional weight. Furthermore, the splined interfaces may interfere with ports for flowing a hydraulic fluid of the wet braking system therethrough. In order to maintain sufficient hydraulic fluid drainage, modifications may be demanded including adding holes to the friction plates and fluid channels to an exterior of the transmission, which may result in a less compact brake/clutch and larger outer dimensions of the transmission.

In one example, the issues described above may be at least partially addressed by a brake system for a transmission, the brake system including a first brake arranged in-line with a second brake along a longitudinal axis of the transmission, and each brake having a plurality of separator plates secured to a housing of the transmission via at least one pin. The brake system may further include an end plate positioned between the first brake and the second brake, the endplate secured to the housing of the transmission by a plurality of dowel pins. In this way, the brake system does not rely on complex and costly milling of splines and maintains a compact footprint.

As one example, the brake system is configured to distribute a braking torque generated by a gear set of the transmission amongst more than one braking interface. The more than one braking interface includes a first braking interface between the first brake and the housing of the transmission, a second braking interface between the second brake and housing, and a third interface between the end plate and the housing. The braking torque is therefore transferred to the housing of the transmission without imposing excessive force at any region of the transmission. Furthermore, by precluding use of splined interfaces, oil drainage through the brake system is increased and, by incorporating a single end plate for both brakes, a length of the transmission is reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
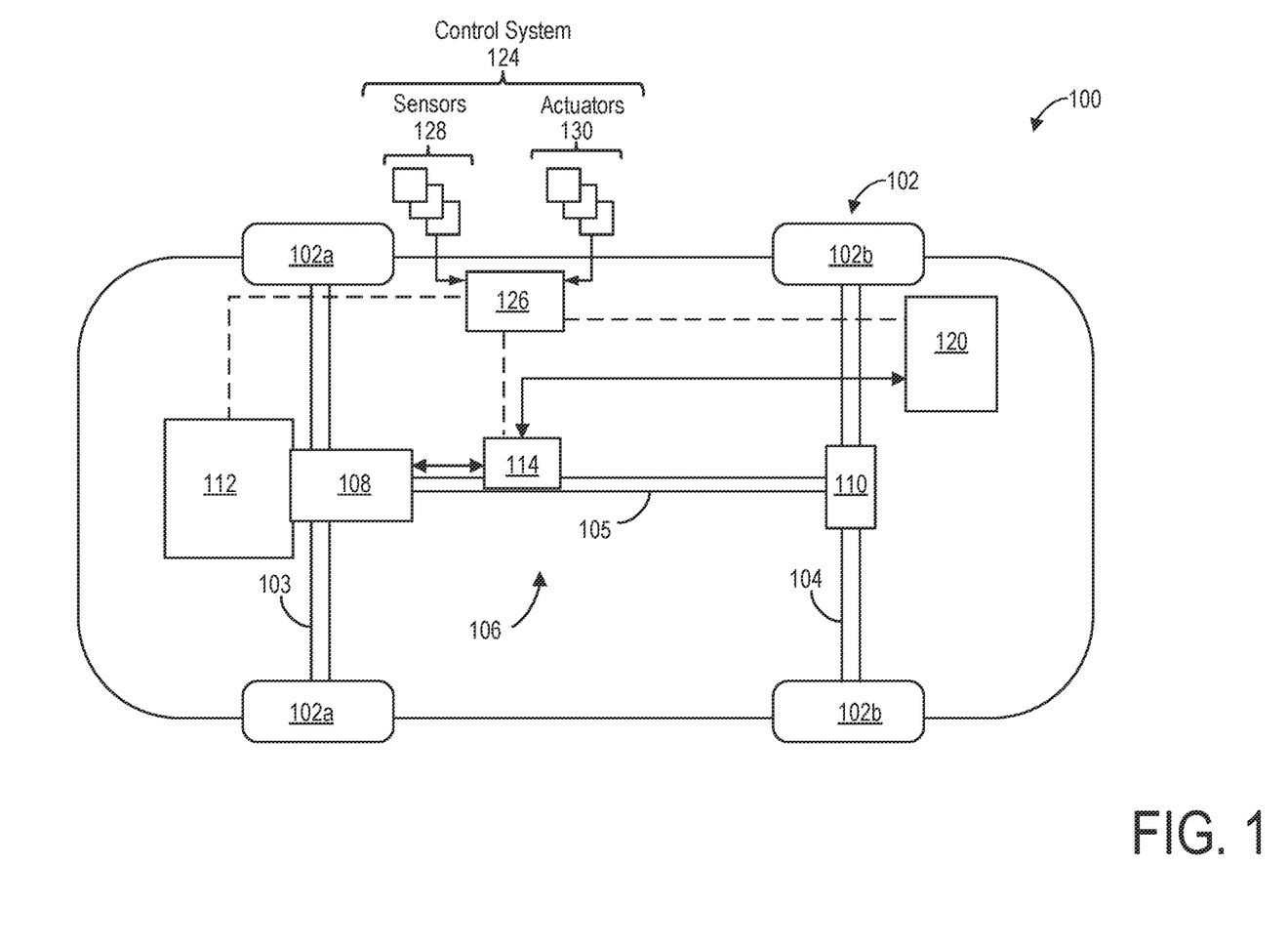
FIG. 1 shows an example of a vehicle drive train.
Figure 2:
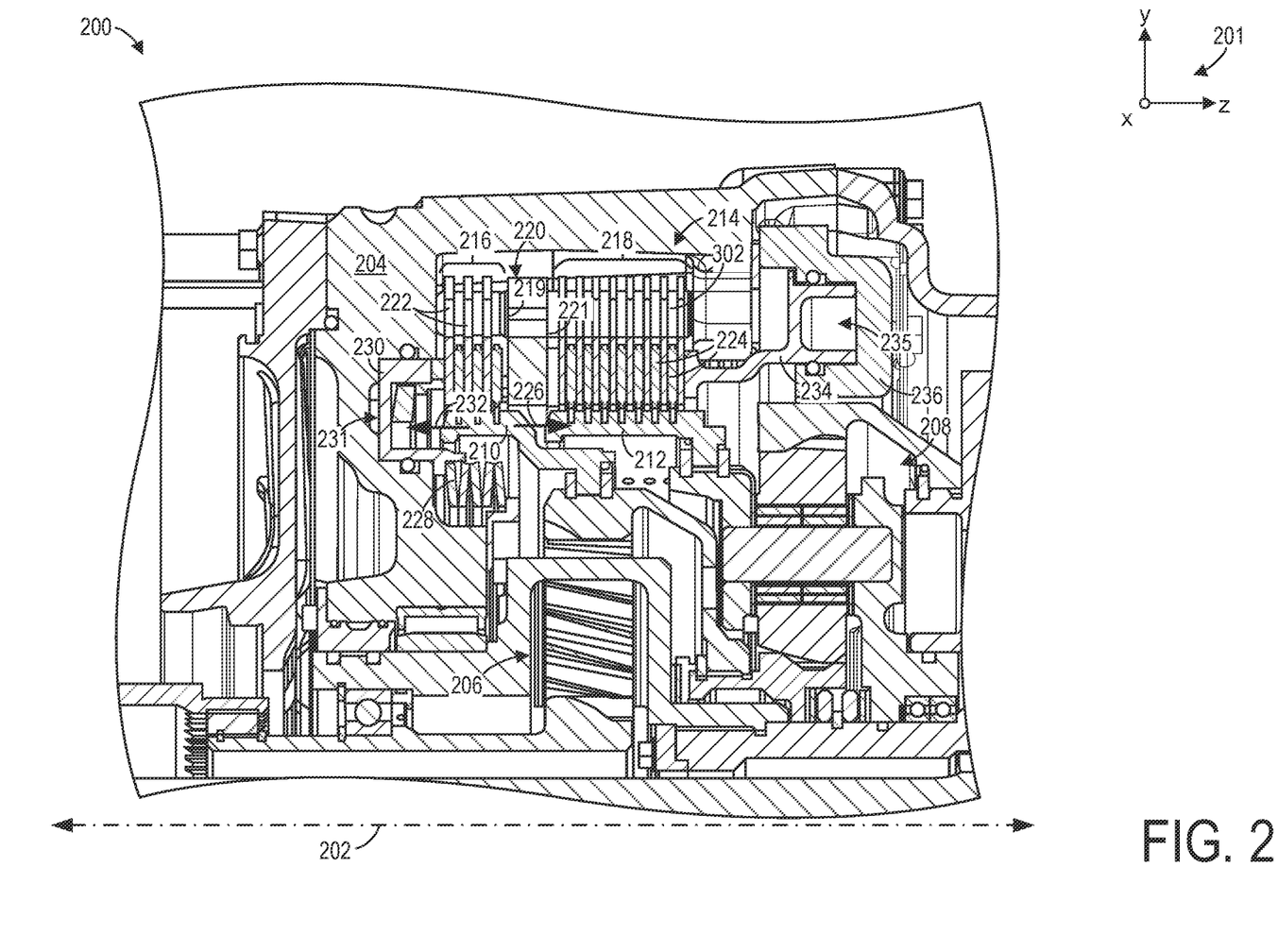
FIG. 2 shows an example of a transmission which may be included in the vehicle drive train of FIG. 1.
Figure 3:
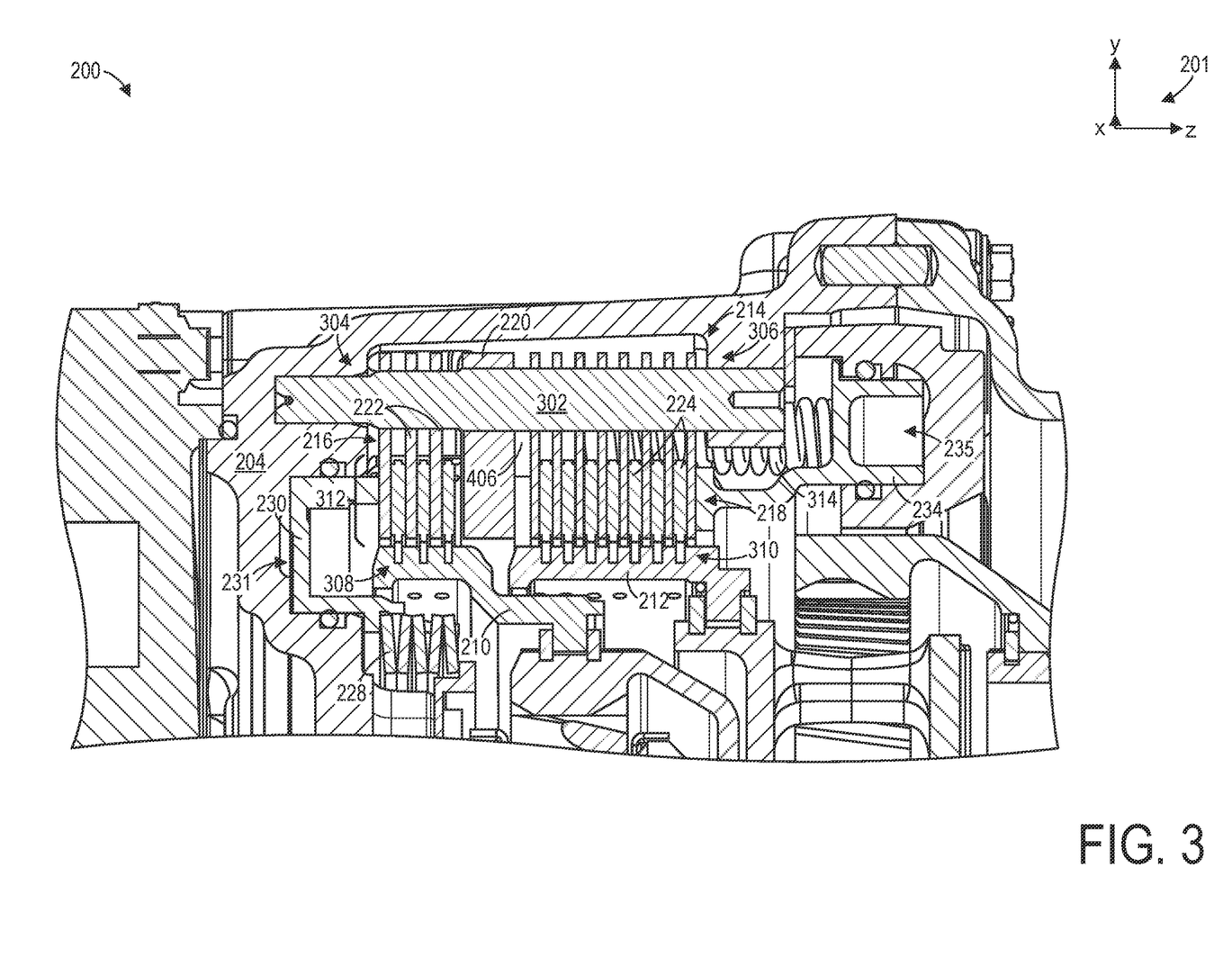
FIG. 3 shows a first view of a brake system of the transmission of FIG. 2.
Figure 4:
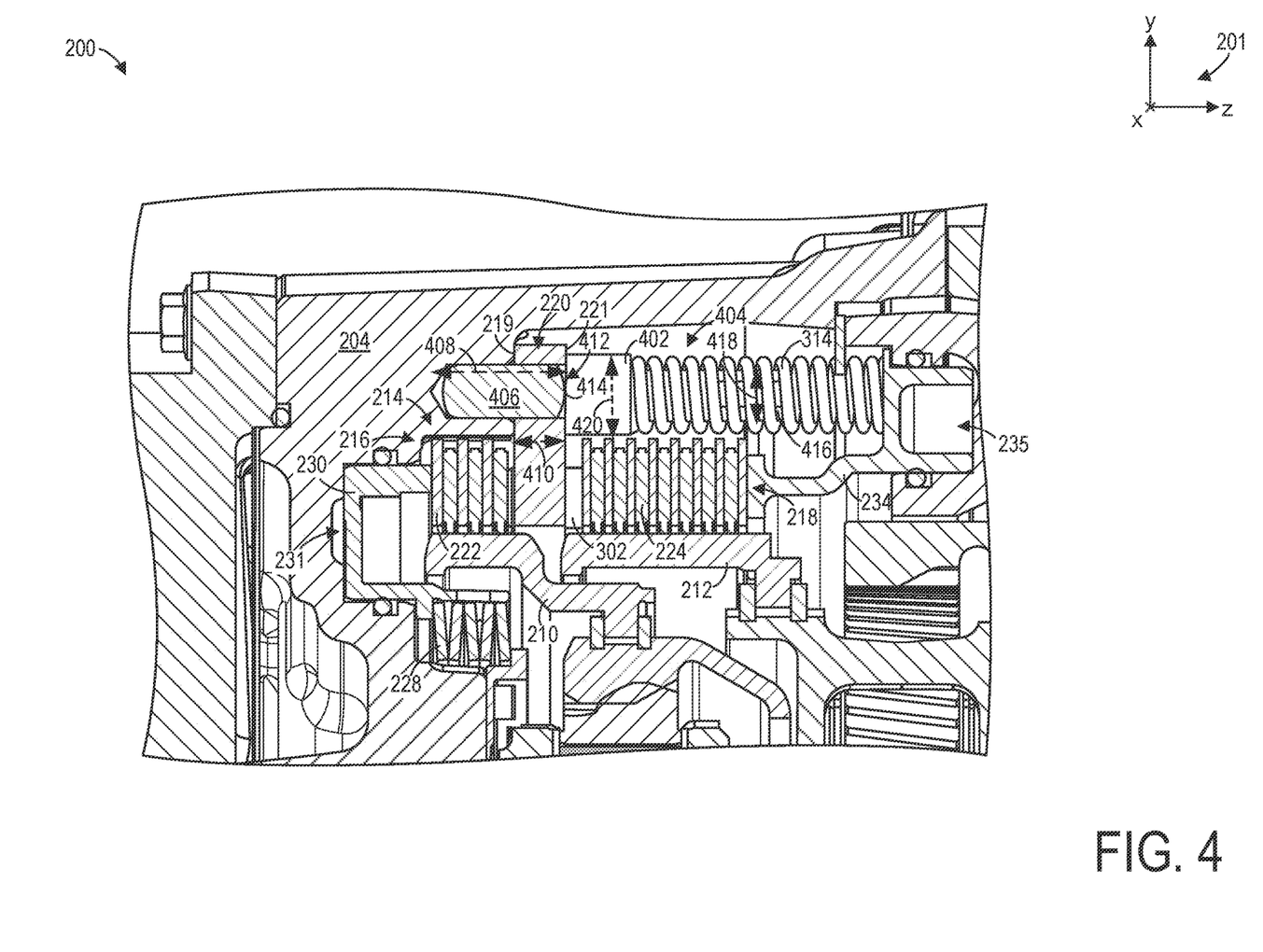
FIG. 4 shows a second view of the brake system of the transmission of FIG. 2.
Figure 5:
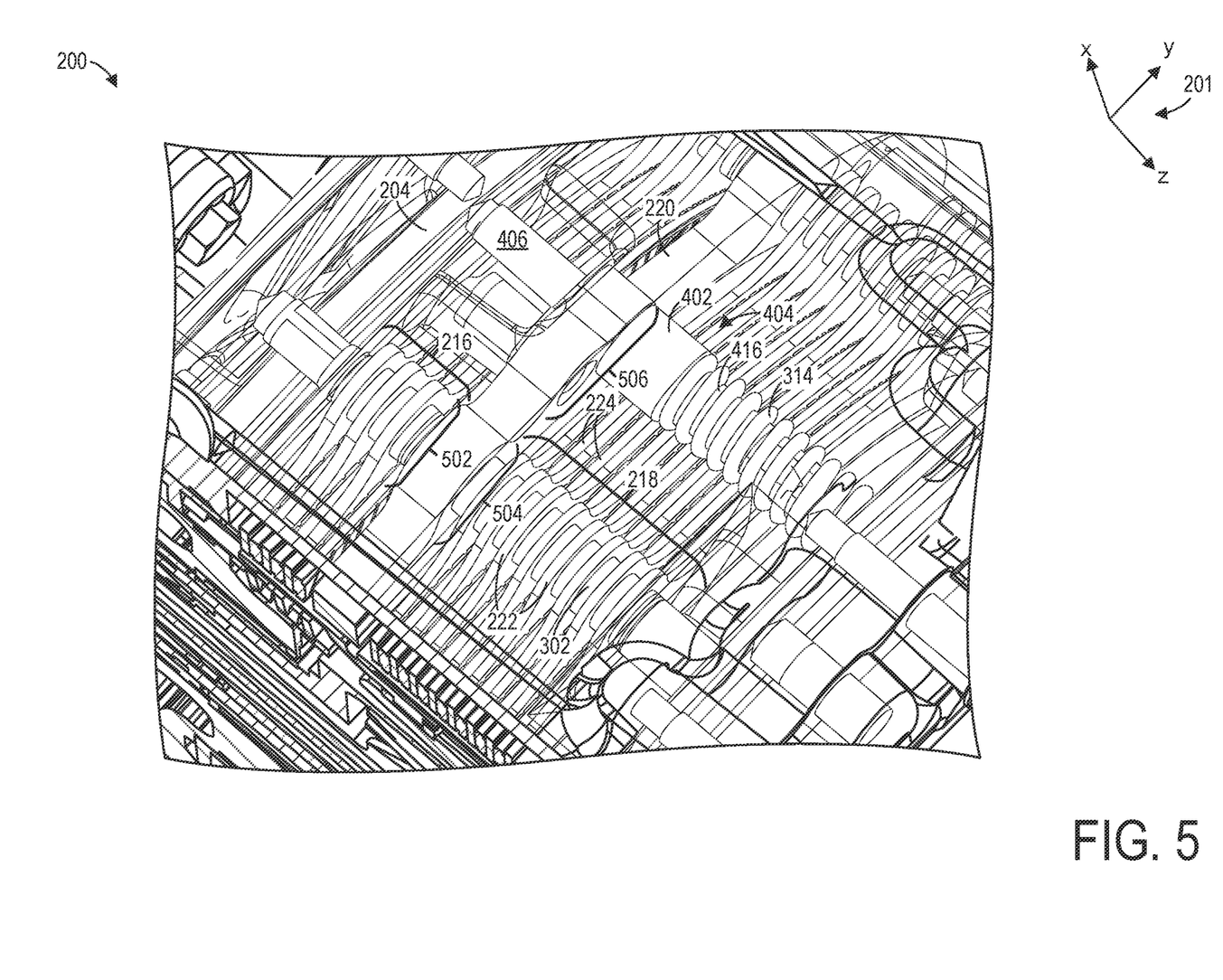
FIG. 5 shows a perspective view of the brake system of the transmission of FIG. 2.

The following description relates to systems and methods for a transmission. The transmission may be implemented in a drive train of a vehicle, as shown in FIG. 1. In one example, the transmission may be configured with an in-line brake system which may distribute a braking torque generated at gears of the transmission amongst more than one interface of the in-line brake system with a housing of the transmission. For example, the in-line brake system may include two brakes arranged in-line, with a single end plate positioned in between the brakes. An example of a transmission incorporating an in-line brake system is depicted in FIG. 2. Different views of the in-line brake system are illustrated in FIGS. 3-5.

Turning now to FIG. 1, a schematic representation of a vehicle 100 is depicted. It will be appreciated that vehicle 100 is shown in FIG. 1 for illustrative purposes and is a non-limiting example of how a vehicle may be configured. Other examples may include variations in arrangements and positioning of vehicle components depicted in FIG. 1, as well as additional components not shown in FIG. 1 for brevity. Vehicle 100 may be an internal combustion engine (ICE) vehicle, a hybrid electric vehicle (HEV), as shown in FIG. 1, or an all-electric vehicle (EV). Vehicle 100 includes wheels 102, e.g., front wheels 102a and rear wheels 102b, with the front wheels 102a coupled by a front axle 103 and the rear wheels 102b coupled by a rear axle 104. As shown in FIG. 1, the vehicle 100 may be configured with rear-wheel drive but other examples include vehicles with front-wheel drive, four-wheel drive or all-wheel drive.

A drive train 106 of vehicle 100 may include a transmission 108 (e.g., a gear box, gear train, etc.) configured to receive torque input from a rotating source and output torque to a drive shaft 105. When configured as the ICE vehicle, the rotating source may be an engine 112. As the HEV, vehicle 100 may have more than one rotating source, including the engine 112 and an electric machine 114. When vehicle 100 is the EV, engine 112 may be omitted and at least one additional electric machine may be incorporated. In some examples, the electric machine 114 may be a motor/generator, with a capacity to convert electrical energy into mechanical energy and vice versa. As such, the electric machine 114 may be electrically coupled to a traction battery 120 of vehicle 100 to both draw power from the traction battery 120 and generate electrical energy to be stored at the traction battery 120.

The drive shaft 105 extends between the transmission 108 and a differential 110 and is engaged by the transmission 108 to output torque. The output torque may be moderated based on selective adjustments to gear engagement at the transmission 108 to accommodate desired vehicle operation. The differential 110 is arranged at a central region of the rear axle 104, and rotation of the drive shaft 105 drives rotation of various gears, such as side gears, pinion gears, etc., of the differential 110, which is transferred to rotation of the rear axle 104.

In this way, the transmission 108 may transmit torque output from the rotating source to the wheels 102 to enable vehicle motion. In one example, the transmission 108 may be an in-line transmission, e.g., an input/output shaft of the transmission is aligned with an output shaft of the rotating source(s), which may be configured with a planetary gear system. The planetary gear system may include various gears and components, such as a ring gear, a sun gear, planetary gears, and a carrier, and vehicle speed may be controlled based on selective engagement of the gears and components with one another. Engagement of the gears and components may be enabled by shifting elements, such as brakes and clutches. In one example, engagement/disengagement of the gears and components with one another and with a housing of the transmission 108 may be enabled by a wet brake system which may rely on flow of a hydraulic fluid, e.g., oil or transmission fluid, to adjust a position of the shifting elements. In some examples, the shifting elements may include separator plates, as described below, which may interface with the housing of the transmission 108 to lock one or more gears and/or components of the shifting elements to the housing. Further details of the transmission 108, and in particular, a braking system for the transmission 108 are provided further below, with reference to FIGS. 2-5.

Vehicle 100 may further include a control system 124, including a controller 126, sensors 128, and actuators 130. Controller 126 may be a microcomputer, including elements such as a microprocessor unit, input/output ports, an electronic storage medium for executable programs and calibration values, e.g., a read-only memory chip, random access memory, keep alive memory, and a data bus. In one example, controller 126 may be a powertrain control module (PCM).

Controller 126 may receive various signals from sensors 128 coupled to various regions of vehicle 100. For example, the sensors 128 may include position sensors coupled to the transmission 108 and the differential 110, engine sensors for monitoring engine speed, temperature, air mass flow, etc., sensors coupled to the traction battery 120 for measuring a battery state of charge and temperature, and sensors coupled to the electric machine 114 for monitoring a status of the electric machine 114. Upon receiving the signals from the various sensors 128 of FIG. 1, controller 126 processes the received signals, and employs various actuators 130 of vehicle 100 to adjust engine and drive train operations based on the received signals as well as instructions stored at a memory of controller 126.

As described above, the transmission, e.g., the transmission 108 of FIG. 1, may include shifting elements that rely on coupling to the transmission housing to adjust gearing ratios of the transmission. The shifting elements may engage with the housing at interfaces between components of the shifting elements and the housing in a manner that locks the components to the housing. In conventional braking systems that rely on the shifting elements for control of the transmission gearing ratios, the interfaces may be splined. For example, separator plates of the shifting elements may be splined at one end to mate with a splined surface of the housing, where engagement at the splined interfaces transmits braking torque to the housing.

Fabrication of the housing with the splined surface, however, may be costly and complex. In addition, the splined interfaces may block and/or interfere with flow of a hydraulic fluid through the shifting elements, the hydraulic fluid providing hydraulic pressure to vary the position of the shifting elements, e.g., between engaged and disengaged positions. Alternatively, as described herein, an in-line brake system may be implemented in the transmission that does not depend on splined interfaces to transfer braking torque from a gearing system of the transmission to the housing.

The in-line brake system may include a first brake and a second brake, aligned with one another along a longitudinal axis of the transmission, and an end plate located between the first brake and the second brake. The end plate may be held stationary along a longitudinal axis of the transmission, e.g., the end plate does not shift axially, by one or more dowel pins. Each of the first brake and the second brake may include separator plates interleaved with friction plates and the separator plates may be held in place by one or more pins extending along the longitudinal axis. The friction plates may be connected to clutch hubs which may, in turn, be coupled to gears and components of the gearing system of the transmission. In this way, the in-line brake system may maintain a compact footprint of the transmission while maintaining costs low and allow for unimpeded flow of hydraulic fluid through the in-line brake system.

An example of a transmission 200 configured with an in-line brake system 214, as described above, is depicted in FIGS. 2-5 from different views. A cross-section of a portion of the transmission 200, including the in-line brake system 214, is illustrated in FIG. 2, and enlarged views of regions of in-line brake system 214 are shown, also presented as cross-sections of the transmission 200, in FIGS. 3-4. The cross-sections shown in FIGS. 3-4 are taken from different planes, therefore showing cut-away views of different components. A perspective view of a portion of the transmission 200 with a section of the transmission housing removed is illustrated in FIG. 5 to show an arrangement of the in-line brake system 214. Further, a set of reference axes 201 are provided, including a y-axis, an x-axis, and a z-axis. In one example, the z-axis is parallel with a longitudinal axis 202 of the transmission 200 which may also be a central axis of rotation of the transmission 200.

The transmission 200 has a housing 204 which encloses various components of the transmission 200. The housing 204 may remain stationary relative to the components enclosed within the housing 204 and therefore may hold the components stationary when the components are locked, e.g., coupled or connected, to the housing 204. The components enclosed within the housing 204 may include a planetary gear system having a ring gear 206 and a carrier 208, which may rotate around the central axis of rotation, as well as other gears not shown in FIGS. 2-5. The ring gear 206 may be coupled to a first clutch hub 210 and the carrier 208 may be coupled to a second clutch hub 212.

The housing 204 of the transmission 200 may also enclose the in-line brake system 214. The in-line brake system 214 may include a first brake 216, a second brake 218, and an end plate 220. The end plate 220 is arranged between the first brake 216 and the second brake 218. The first brake 216, the second brake 218, and the end plate 220 may be aligned along the longitudinal axis 202. As shown in greater detail in FIG. 3, each of the first brake 216 and the second brake 218 includes a plurality of separator plates 222 with friction plates 224 interleaved between the plurality of separator plates 222.

The plurality of separator plates 222 may be fixed in place by a pin 302, as shown in greater detail in FIG. 3, the pin 302 extending along the z-axis between a first side 304 of the housing 204 and a second side 306 of the housing 204. The pin 302 may also extend through openings in the plurality of separator plates 222 and in the end plate 220, the openings aligned along the longitudinal axis 202. The first side 304 and the second side 306 of the housing 204 are aligned perpendicular to the z-axis. It will be appreciated that the in-line brake system 214 may include more than one set of the pin 302 and the plurality of separator plates 222, interleaved with the friction plates 224, that are arranged around a perimeter/circumference of the transmission 200, as shown in FIG. 5. For example, two sets of the plurality of separator plates and the friction plates are shown in FIG. 2.

The pin 302 may be formed of a rigid, durable material, and may inhibit rotational movement of the plurality of separator plates 222 and of the end plate 220. As depicted in FIG. 3, each end of the pin 302 may be embedded into the housing 204, e.g., at recesses or openings arranged in the first side 304 and the second side 306, such that the pin 302 does not move. The plurality of separator plates 222 may also be formed of a rigid, durable material and may extend circumferentially around the first and second clutch hubs 210, 212. Each of the plurality of separator plates 222 may be configured with various openings to accommodate flow of a hydraulic fluid therethrough.

The friction plates 224 may be formed of a friction-inducing material and may each be shaped as an annular disc, circumferentially surrounding the first and second clutch hubs 210, 212. The friction plates 224 may be coupled to the clutch hubs, as described below and may overlap with a portion of a width of the plurality of separator plates 222, the width defined along the x-y plane. For example, a width of the friction plates 224 may be less than the width of the plurality of separator plates 222 and an overlapping region 312 of the widths of the plates may extend between the pin 302 and the first and second clutch hubs 210, 212. Outer edges of the friction plates 224, however, remain spaced away from the pin 302 along the y-axis and therefore do not contact the pin 302. In this way, rotation of the friction plates 224 is not impeded by contact with the pin 302.

The plurality of separator plates 222 and the friction plates 224 may be radially offset from the first clutch hub 210 and the second clutch hub 212, e.g., the plates are offset from the clutch hubs along radial directions radiating outwards and perpendicular from the central axis of rotation of the transmission 200. As shown in FIGS. 2-5, the plurality of separator plates 222 and the friction plates 224 may be offset from the first clutch hub 210 and the second clutch hub 212 such that the plates are further away from the central axis of rotation than the clutch hubs and may therefore be positioned around and outside of a circumference of the clutch hubs.

Turning again to FIG. 3, the friction plates 224 of the first brake 216 may be coupled to the first clutch hub 210 along a splined outer surface 308 of the first clutch hub 210. An inner edge, e.g., an edge proximate to the central axis of rotation, of each of the friction plates 224 may be inserted into a recess of the splined outer surface 308 of the first clutch hub 210. The inner edge of each of the friction plates 224 may be fixedly coupled to the splined outer surface 308 of the first clutch hub 210 such that the friction plates 224 rotate with the first clutch hub 210, such as when the first clutch hub 210 is not in an engaged position, as described further below. The plurality of separator plates 222 of both the first brake 216 and the second brake 218 do not rotate.

Similarly, the friction plates 224 of the second brake 218 may be coupled to the second clutch hub 212 along a splined outer surface 310 of the second clutch hub 212. An inner edge of each of the friction plates 224 of the second clutch hub 212 may be inserted into a recess of the splined outer surface 310 of the second clutch hub 212 and fixedly coupled such that the friction plates 224 of the second brake 218 rotate with the second clutch hub 212.

Each of the first and second clutch hubs 210, 212 may slide axially, e.g., along the longitudinal axis 202 of FIG. 2, based on hydraulic pressure provided by the hydraulic fluid. For example, as shown in FIG. 2, the first clutch hub 210 may slide along a first direction, as indicated by arrow 226, into an engaged position when the hydraulic fluid is flowed into a first cavity 231, where the first piston 230 is arranged in the first cavity 231. The first piston 230 may be coupled to and extend between a first spring 228 and a terminal plate (e.g., furthest to the left) of the plurality of separator plates 222 of the first brake 216. The first spring 228 may be positioned inside of the first clutch hub 210, e.g., along a side of the first clutch hub 210 opposite of the friction plates 224 of the first brake 216. A first end of the first spring 228 may abut the first piston 230 and a second, opposite end of the first spring 228 may abut the first clutch hub 210.

As the hydraulic fluid fills the first cavity 231, the hydraulic pressure within the first cavity 231 increases, forcing the first piston 230 and the first clutch hub 210 to slide axially along the first direction into the engaged position. In the engaged position, the first clutch hub 210 is engaged with the housing 204 such that rotational movement of the first clutch hub 210 is transferred to the housing 204, thereby inhibiting the rotational movement. As the first clutch hub 210 is adjusted to the engaged position, each of the friction plates 224 of the first brake 216 may also slide axially along with the first clutch hub 210, e.g., along the first direction indicated by arrow 226. The axial motion causes the friction plates 224 of the first brake 216 to press against the plurality of separator plates 222 and against a first surface 219 of the end plate 220 (which is held stationary with respect to axial motion). Friction generated between the friction plates 224 the plurality of separator plates 222 and between one of the friction plates 224 and the end plate 220 resists rotation of the friction plates 224, and therefore also resists rotation of the first clutch hub 210.

Furthermore, as the first clutch hub 210 slides along the first direction, the first spring 228, which extends between the first piston 230 and the first clutch hub 210, is compressed along the longitudinal axis 202. The hydraulic pressure therefore must overcome a spring force of the first spring 228 in order to force the first clutch hub 210 to slide axially along the first direction.

When the first clutch hub 210 slides to a maximum extent along the first direction, as defined by the first brake 216 abutting the end plate 220, sufficient friction may be generated between the friction plates 224, the plurality of separator plates 222, which are fixed in place by the pin 302, and the end plate 220 (also fixed in place) to inhibit rotation of the friction plates 224 and the first clutch hub 210. As a result, rotation of the ring gear 206 is also blocked and a braking torque imposed on the friction plates 224 of the first brake 216 by the ring gear 206 is transferred to the housing 204 via the plurality of separator plates 222 and the pin 302, as well as via the end plate 220 and a dowel pin 406 coupled to the end plate 220, as shown in FIG. 4 and described further below.

The first clutch hub 210 may be adjusted to a disengaged position (e.g., disengaged from the housing 204) by releasing, e.g., decreasing the hydraulic pressure by flowing the hydraulic fluid out of the first cavity 231. The spring force of the first spring 228 pushes the first clutch hub 210 along a second direction as the first spring 228 expands, as indicated by arrow 232 of FIG. 2, opposite of the first direction. When the first clutch hub 210 slides axially along the second direction to a maximum extent, which may be determined by the first clutch hub 210 abutting the housing 204, the friction plates 224 no longer press against the plurality of separator plates 222. Minimal friction is generated between the friction plates 224 of the first brake 216 and the plurality of separator plates 222, and the friction plates 224, the first clutch hub 210, and the ring gear 206 are able to rotate.

In some examples, adjusting the first clutch hub 210 between the engaged and disengaged positions may result in the ring gear 206 being disengaged and engaged, respectively, from one or more gears of the planetary gear set of the transmission 200. For example, when the first clutch hub 210 is engaged and locked to the housing 204, the ring gear 206 is not a member of the gears actively providing a target gearing ratio. When the first clutch hub 210 is disengaged and the ring gear 206 is allowed to rotate, the ring gear 206 may engage with the gears actively providing the target gearing ratio. The carrier 208 may be similarly adjusted between active participation in the target gearing ratio and disengagement from the active gears providing the target gearing ratio via actuation of the second clutch hub 212.

For example, the hydraulic pressure may be adjusted at a second cavity 235 to compel the second clutch hub 212 to slide axially along the second direction, as indicated by arrow 232 in FIG. 2, into an engaged position. In the engaged position, the second clutch hub 212 may be locked to the housing 204 of the transmission 200. To adjust the second clutch hub 212 to the engaged position, the hydraulic fluid may be flowed into the second cavity 235 in which a second piston 234 is located. The second piston 234 may be coupled to and abut a terminal plate (e.g., furthest to the right) of the plurality of separator plates 222 of the second brake 218.

As the hydraulic pressure in the second cavity 235 increases, the second clutch hub 212 is forced to slide axially along the second direction, as indicated by arrow 232. As the second clutch hub 212 slides, the friction plates 224 of the second brake 218 also slide axially along the second direction, causing the each of the friction plates 224 to press against one of the plurality of separator plates 222 of the second brake 218, e.g., each friction plate presses against a separator plate to the left of each friction plate and also against a second surface 221 of the end plate 220, the second surface 221 opposite of the first surface 219. A maximum extent of the axial sliding of the second clutch hub 212 along the second direction is defined by the end plate 220, e.g., by the second brake 218 abutting the end plate 220. Furthermore, as the second clutch hub 212 and the friction plates 224 of the second brake 218 slide along the second direction, a second spring 314 (as shown in FIGS. 3 and 4) is compressed. The hydraulic pressure must therefore be greater than a spring force of the second spring 314 to drive axial motion of the second clutch hub 212.

As depicted in FIG. 4, the second spring 314 may be compressed between a head 402 of a rivet 404 and a second piston 234 of the in-line brake system 214. Details of the rivet 404 are provided further below. When the second clutch hub 212 reaches the maximum extent of axial sliding along the second direction, the carrier 208, as shown in FIG. 2, may be locked to the housing via the plurality of separator plates 222 of the second brake 218 and the pin 302. The carrier 208 is thereby disengaged from other gears of the planetary gear set of the transmission 200. To engage the carrier 208 with the other gears of the planetary gear set, the hydraulic pressure in the second cavity 235 may be released, e.g., decreased. When the hydraulic pressure decreases to below the spring force of the second spring 314, the second spring 314 may expand and relax, driving axial sliding of the second clutch hub 212 and the friction plates 224 of the second brake 218 along the first direction, as indicated by arrow 226.

When the second clutch hub 212 slides to a maximum extent along the first direction, which may be determined by the second clutch hub 212 abutting a piston cap 236, the friction plates 224 of the second brake 218 no longer press against the plurality of separator plates 222. Friction between the plates is reduced, allowing the second clutch hub 212, the friction plates, and the carrier 208 to rotate. The carrier 208 may be selectively engaged with the other gears of the planetary gear set.

As described above, adjustment of the clutch hubs to the engaged positions may rely on contact between the friction plates 224 of each of the first and second brakes 216, 218 with the end plate 220. The end plate 220 is maintained stationary with respect to axial movement by a dowel pin 406, as shown in FIG. 4. The dowel pin 406 extends parallel with the z-axis (e.g., a length 408 of the dowel pin 406 is aligned parallel with the longitudinal axis 202 of FIG. 2). Furthermore, the dowel pin 406 may be aligned with the rivet 404 along the z-axis.

The length 408 of the dowel pin 406 may be greater than a thickness 410 of the end plate 220, such that a portion of the length 408 of the dowel pin 406 may protrude from the end plate 220 along the z-axis when the dowel pin 406 is inserted into a through-hole 412 of the end plate 220, as shown in FIG. 4. The portion of the length 408 of the dowel pin 406 that protrudes from the end plate 220 may be embedded in a corresponding recess in the housing 204 such that the dowel pin 406 is held firmly in place within the recess. An end 414 of the dowel pin 406 that is inserted into the through-hole 412 may be flush with the second surface 221 of the end plate 220.

The rivet 404 may be maintained in place at least in part by various stabilizing mechanisms, such as a groove in the end plate 220, brackets, etc., and in part by extension of the second spring 314 between the head 402 of the rivet 404 and the second clutch hub 212. A body 416 of the rivet 404 may have a diameter 418 that is smaller than a diameter 420 of the head 402 of the rivet 404. The body 416 may be circumferentially surrounded by and enclosed within the second spring 314. In addition, a length of the second spring 314, as defined along the z-axis, may be greater than a length of the body 416 of the rivet 404.

The end plate 220 is thereby maintained stationary relative to the planetary gear set, the friction plates, and the clutch hubs of the transmission 200. For example, rotation of the end plate 220 is blocked by coupling of the end plate to the pin 302 and axial sliding of the end plate 220 is blocked by coupling of the end plate to the dowel pin 406 and the rivet 404. By inhibiting movement of the end plate 220, the end plate 220 may define boundaries of axial movement of the first and second brakes 216, and 218, and provide a stable barrier between the brakes that resists pressure exerted on the end plate by the brakes. Additionally, by configuring the first and second brakes to engage/disengage in opposite directions, a single endplate may be used for both brakes, reducing a number of components and a weight of the in-line brake system 214, relative to conventional wet braking systems.

As described above, the plurality of separator plates 222 and the friction plates 224 may extend circumferentially around the transmission 200, inside of the housing 204. A perspective view of the transmission 200 with a portion (e.g., an outer face) of the housing removed is shown in FIG. 5. The first brake 216 is arranged in-line with the second brake 218 along the z-axis (e.g., along the longitudinal axis and the central axis of rotation) and the end plate 220 is positioned in between the first brake 216 and the second brake 218.

As illustrated in the perspective view of FIG. 5, the plurality of separator plates 222 may include lobes 502 that protrude outward, away from the central axis of rotation. The lobes 502 may have openings through which the pin 302 extends. Similarly, the end plate 220 may also include a first lobe 504 which protrudes outwards, away from the central axis of rotation. The first lobe 504 of the end plate 220 also has an opening which is aligned with the openings of the plurality of separator plates 222 such that the pin 302 also extends through the opening of the end plate 220 at the first lobe 504. The friction plates 224, however, do not have lobes and an outer edge of each of the friction plates 224, e.g., an edge distal from the central axis of rotation, extends circumferentially around the transmission inside of the pin 302, as well as inside of the dowel pin 406 and the rivet 404.

At a region of the end plate 220 where the dowel pin 406 and the rivet 404 interface with the end plate 220, the end plate 220 has a second lobe 506 that also protrudes outwards, away from the central axis of rotation. The second lobe 506 includes the through-hole (e.g., the through-hole 412 shown in FIG. 4) into which the dowel pin 406 is inserted. The outer edge of each of the friction plates 224 and of each of the plurality of separator plates 222 have radii that allow the outer edges to extend continuously around the central axis of rotation inside of the dowel pin 406 and the rivet 404.

It will be appreciated that the plurality of separator plates 222 may have more than one iteration of the lobes 502 around the circumference of the plurality of separator plates 222, each iteration corresponding to positioning of the pin 302. Further, there may be more than one of the pin 302 positioned around the circumference of the plurality of separator plates 222. The pin 302 and the dowel pin 406/rivet 404 may be placed in an alternating order around the radial perimeter (e.g., circumference) of the transmission, inside of the housing. In other words, the ordering of the pin 302 and the dowel pin 406/rivet 404 may be such that no two pins 302 are adjacent to one another without a dowel pin/rivet in between, and, similarly, no two dowel pins 406/rivets 404 are positioned adjacent to one another without a pin in between.

By fixing a position of the plurality of separator plates of the first and second brakes by the pin, and a position of the end plate via the dowel pin, the brake torque imposed by gears and components of the planetary gear set may be distributed amongst more than one braking interface of the in-line brake system. For example, a first portion of the braking torque may be transmitted to a first braking interface between the first brake and the housing of the transmission, a second portion of the braking torque may be transmitted to a second braking interface between the second brake and the housing, and a third portion of the braking torque may be transmitted to a third braking interface between the end plate and the housing. The braking torque is therefore transferred to the housing without imposing excessive force at any region of the in-line brake system.

The in-line brake system also precludes complex milling of splines into the housing and reduces interferences with a flow of hydraulic fluid, thereby enabling increased fluid drainage. In addition, the in-line brake system relies on one endplate for both brakes and can be used in both a dry or wet environment, e.g., with dry or wet brakes. As a result, an overall length, outer diameter, and weight of the transmission may be reduced relative to conventional wet braking systems. The in-line brake system may provide a cost effective option for low volume applications.

FIGS. 2-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. FIGS. 2-6 are shown approximately to scale.

It will be appreciated that the configurations and routines disclosed herein are exemplary in nature, and that these specific embodiments are not to be considered in a limiting sense, because numerous variations are possible. The subject matter of the present disclosure includes all novel and non-obvious combinations and sub-combinations of the various systems and configurations, and other features, functions, and/or properties disclosed herein.

The disclosure also provides support for a brake system for a transmission, comprising: a first brake arranged in-line with a second brake along a longitudinal axis of the transmission, each brake having a plurality of separator plates secured to a housing of the transmission via at least one pin, and an end plate positioned between the first brake and the second brake, the end plate secured to the housing of the transmission by a plurality of dowel pins. In a first example of the system, the at least one pin extends through the plurality of separator plates and through the end plate along the longitudinal axis between a first side and a second side of the housing, the first side and the second side of the housing arranged perpendicular to the longitudinal axis and at opposite of ends of the transmission. In a second example of the system, optionally including the first example, the plurality of dowel pins are arranged parallel with the longitudinal axis and offset from the plurality of separator plates and wherein the plurality of dowel pins are positioned radially outside of outer edges of the plurality of separator plates. In a third example of the system, optionally including one or both of the first and second examples, a first end of each of the plurality of dowel pins is recessed into the first side of the housing and a second end of each of the plurality of dowel pins, the second end opposite of the first end, is inserted through a through-hole of the end plate. In a fourth example of the system, optionally including one or more or each of the first through third examples, the second end of each of the plurality of dowel pins abuts a head of a rivet, the rivet arranged parallel with the longitudinal axis and aligned with a respective dowel pin of the plurality of dowel pins. In a fifth example of the system, optionally including one or more of each of the first through fourth examples, a spring surrounds a body of each of the plurality of dowel pins, the spring extending along the longitudinal axis between the head of the rivet and a piston. In a sixth example of the system, optionally including one or more or each of the first through fifth examples, the first brake is coupled to a ring gear of a planetary gear set of the transmission and the second brake is coupled to a carrier of the planetary gear set.

The disclosure also provides support for a brake system for an in-line transmission, comprising: a pin extending through separator plates of a first brake, through separator plates of a second brake, and through an end plate positioned between the first brake and the second brake, the first brake, the second brake, and the end plate arranged in-line around a circumference of the transmission, a first spring coupled to the first brake and a second spring coupled to the second brake, the first and second springs configured to counter a hydraulic pressure to cause the first and second brakes to slide axially, and a dowel pin abutting a rivet and aligned with the rivet along a longitudinal axis of the in-line transmission, the dowel pin and the rivet holding the end plate stationary relative to axial motion. In a first example of the system, the pin is fixedly coupled to a housing of the transmission to maintain the separator plates of the first brake, the separator plates of the second brake, and the end plate stationary relative to rotational movement. In a second example of the system, optionally including the first example, the separator plates of the first brake and the separator plates of the second brake are interleaved with friction plates and wherein the separator plates of the first brake and the separator plates of the second brake include lobes that extend further outwards and away from a central axis of rotation of the in-line transmission than an outer edge of the friction plates. In a third example of the system, optionally including one or both of the first and second examples, the pin extends through openings in the lobes of the separator plates of the first brake and the lobes of the separator plates of the second brake. In a fourth example of the system, optionally including one or more or each of the first through third examples, the first spring is located on an opposite side of a first clutch hub from the first brake along a direction perpendicular to the longitudinal axis, and wherein the first clutch hub is coupled to the first brake and a first component of a gear set of the in-line transmission. In a fifth example of the system, optionally including one or more or each of the first through fourth examples, the first spring abuts a first piston at a first end of the first spring and abuts the first clutch hub at a second, opposite end of the first spring. In a sixth example of the system, optionally including one or more or each of the first through fifth examples, the second spring circumferentially surrounds a body of the rivet, the rivet arranged radially outside of an outer edge of the separator plates of the second brake. In a seventh example of the system, optionally including one or more or each of the first through sixth examples, the second spring abuts a head of the rivet at a first end and abuts a second piston at a second, opposite end of the second spring. In an eighth example of the system, optionally including one or more or each of the first through seventh examples, the dowel pin is positioned radially outside of an outer edge of the separator plates of the first brake.

The disclosure also provides support for a transmission for a vehicle, comprising: a first braking interface between a first brake and a housing of the transmission, a second braking interface between a second brake and the housing of the transmission, the second brake arranged in-line with the first brake, and a third braking interface between an end plate and the housing of the transmission, the end plate positioned between the first brake and the second brake, wherein a braking torque is distributed amongst each of the first, second, and third braking interfaces by a plurality of pins coupling the first brake and the second brake to the housing of the transmission and by a plurality of dowel pins coupling the end plate to the housing. In a first example of the system, the first brake is configured to lock to the housing of the transmission when a first piston is driven to slide along a first axial direction based on hydraulic pressure, and wherein the first piston forces the first brake to slide along the first axial direction and press against a first surface of the end plate. In a second example of the system, optionally including the first example, the second brake is configured to lock to the housing of the transmission when a second piston is driven to slide along a second axial direction, opposite of the first axial direction, based on hydraulic pressure, and wherein the second piston forces the second brake to slide along the second axial direction and press against a second surface of the end plate, opposite of the first surface. In a third example of the system, optionally including one or both of the first and second examples, the first brake and the second brake are unlocked from the housing when the hydraulic pressure is reduced to below a spring force of a first spring configured to expand and drive sliding of the first brake along the second axial direction and below a spring force of a second spring configured to expand and drive sliding of the second brake along the first axial direction.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A brake system for a transmission, comprising:
a first brake arranged in-line with a second brake along a longitudinal axis of the transmission, each brake having a plurality of separator plates secured to a housing of the transmission via at least one pin; and
an end plate positioned between the first brake and the second brake, the end plate secured to the housing of the transmission by a plurality of dowel pins, wherein the plurality of dowel pins each abut a head of a rivet.

2. The brake system of claim 1, wherein the at least one pin extends through the plurality of separator plates and through the end plate along the longitudinal axis between a first side and a second side of the housing, the first side and the second side of the housing arranged perpendicular to the longitudinal axis and at opposite of ends of the transmission.

3. The brake system of claim 2, wherein the plurality of dowel pins are arranged parallel with the longitudinal axis and offset from the plurality of separator plates, and wherein the plurality of dowel pins are positioned radially outside of outer edges of the plurality of separator plates.

4. The brake system of claim 3, wherein a first end of each of the plurality of dowel pins is recessed into the first side of the housing and a second end of each of the plurality of dowel pins, the second end opposite of the first end, is inserted through a through-hole of the end plate.

5. The brake system of claim 4, wherein the second end of each of the plurality of dowel pins abuts the head of the rivet, the rivet arranged parallel with the longitudinal axis and aligned with a respective dowel pin of the plurality of dowel pins.

6. The brake system of claim 5, wherein a spring surrounds a body of the rivet, the spring extending along the longitudinal axis between the head of the rivet and a piston.

7. The brake system of claim 1, wherein the first brake is coupled to a ring gear of a planetary gear set of the transmission and the second brake is coupled to a carrier of the planetary gear set.

8. A brake system for an in-line transmission, comprising:
a pin extending through separator plates of a first brake, through separator plates of a second brake, and through an end plate positioned between the first brake and the second brake, the first brake, the second brake, and the end plate arranged in-line around a circumference of the transmission;
a first spring coupled to the first brake and a second spring coupled to the second brake, the first and second springs configured to counter a hydraulic pressure to cause the first and second brakes to slide axially; and
a dowel pin abutting a rivet and aligned with the rivet along a longitudinal axis of the in-line transmission, the dowel pin and the rivet holding the end plate stationary relative to axial motion.

9. The brake system of claim 8, wherein the pin is fixedly coupled to a housing of the transmission to maintain the separator plates of the first brake, the separator plates of the second brake, and the end plate stationary relative to rotational movement.

10. The brake system of claim 8, wherein the separator plates of the first brake and the separator plates of the second brake are interleaved with friction plates, and wherein the separator plates of the first brake and the separator plates of the second brake include lobes that extend further outwards and away from a central axis of rotation of the in-line transmission than an outer edge of the friction plates.

11. The brake system of claim 10, wherein the pin extends through openings in the lobes of the separator plates of the first brake and the lobes of the separator plates of the second brake.

12. The brake system of claim 8, wherein the first spring is located on an opposite side of a first clutch hub from the first brake along a direction perpendicular to the longitudinal axis, and wherein the first clutch hub is coupled to the first brake and a first component of a gear set of the in-line transmission.

13. The brake system of claim 12, wherein the first spring abuts a first piston at a first end of the first spring and abuts the first clutch hub at a second, opposite end of the first spring.

14. The brake system of claim 8, wherein the second spring circumferentially surrounds a body of the rivet, the rivet arranged radially outside of an outer edge of the separator plates of the second brake.

15. The brake system of claim 8, wherein the second spring abuts a head of the rivet at a first end and abuts a second piston at a second, opposite end of the second spring.

16. The brake system of claim 8, wherein the dowel pin is positioned radially outside of an outer edge of the separator plates of the first brake.

17. A transmission for a vehicle, comprising:
a first braking interface between a first brake and a housing of the transmission;
a second braking interface between a second brake and the housing of the transmission, the second brake arranged in-line with the first brake; and
a third braking interface between an end plate and the housing of the transmission, the end plate positioned between the first brake and the second brake;
wherein a braking torque is distributed amongst each of the first, second, and third braking interfaces by a plurality of pins coupling the first brake and the second brake to the housing of the transmission and by a plurality of dowel pins coupling the end plate to the housing of the transmission, the plurality of pins each abutting a head of a rivet.

18. The transmission of claim 17, wherein the first brake is configured to lock to the housing of the transmission when a first piston is driven to slide along a first axial direction based on hydraulic pressure, and wherein the first piston forces the first brake to slide along the first axial direction and press against a first surface of the end plate.

19. The transmission of claim 18, wherein the second brake is configured to lock to the housing of the transmission when a second piston is driven to slide along a second axial direction, opposite of the first axial direction, based on hydraulic pressure, and wherein the second piston forces the second brake to slide along the second axial direction and press against a second surface of the end plate, opposite of the first surface.

20. The transmission of claim 19, wherein the first brake and the second brake are unlocked from the housing when the hydraulic pressure is reduced to below a spring force of a first spring configured to expand and drive sliding of the first brake along the second axial direction and below a spring force of a second spring configured to expand and drive sliding of the second brake along the first axial direction.

* * * * *